(12) United States Patent
Azuma (10) Patent No.: US 7,409,191 B2
(45) Date of Patent: Aug. 5, 2008

(54) TRANSMITTING APPARATUS EMPLOYING ONLINE CALIBRATION

(75) Inventor: Tomohiro Azuma, Tokyo (JP)

(73) Assignee: NEC Corporation, Tokyo (JP)

( * ) Notice: Subject to any disclaimer, the term of this patent is extended or adjusted under 35 U.S.C. 154(b) by 465 days.

(21) Appl. No.: 11/147,443

(22) Filed: Jun. 8, 2005

(65) Prior Publication Data

US 2005/0282506 A1 Dec. 22, 2005

(30) Foreign Application Priority Data

Jun. 16, 2004 (JP) ............................. 2004-178038

(51) Int. Cl.
H04B 1/02 (2006.01)

(52) U.S. Cl. ................. 455/103; 455/115.1; 455/115.2; 375/267; 375/299

(58) Field of Classification Search ............ 455/91, 455/95, 102, 103, 126, 129, 424, 425, 456.5, 455/456.6, 13.3, 13.4, 17, 522, 69, 70, 67.14, 455/561, 562.1, 115.1, 115.2, 550.1, 575.1, 455/67.11, 67.13, 114.2; 375/298, 267, 135, 375/146, 221, 295, 260; 342/174, 368, 372, 342/82, 165

See application file for complete search history.

(56) References Cited

U.S. PATENT DOCUMENTS

| | | | | |
|---|---|---|---|---|
| 5,530,449 | A * | 6/1996 | Wachs et al. ................. | 342/174 |
| 5,929,809 | A | 7/1999 | Erlick et al. | |
| 6,295,027 | B1 * | 9/2001 | Wixforth et al. ............ | 342/368 |
| 6,339,399 | B1 * | 1/2002 | Andersson et al. .......... | 342/372 |
| 6,762,717 | B2 * | 7/2004 | Hirabe ........................ | 342/368 |
| 7,027,482 | B1 * | 4/2006 | Nomura ....................... | 375/130 |
| 7,106,249 | B2 * | 9/2006 | Kubo et al. .................. | 342/174 |
| 7,120,188 | B2 * | 10/2006 | Zeira et al. ................... | 375/130 |
| 7,205,936 | B2 * | 4/2007 | Park et al. .................... | 342/368 |
| 7,248,216 | B2 * | 7/2007 | Akiyama et al. ............. | 342/368 |
| 2002/0018530 | A1 * | 2/2002 | Kim et al. .................... | 375/267 |
| 2003/0002594 | A1 | 1/2003 | Harel et al. | |
| 2003/0174783 | A1 * | 9/2003 | Rahman et al. ............. | 375/298 |
| 2004/0198269 | A1 * | 10/2004 | Phillips ....................... | 455/126 |

(Continued)

FOREIGN PATENT DOCUMENTS

EP 1 296 465 A1 3/2003

(Continued)

*Primary Examiner*—Edward Urban
*Assistant Examiner*—Charles Chow
(74) *Attorney, Agent, or Firm*—Dickstein Shapiro LLP (57) ABSTRACT

A transmitting apparatus includes a plurality of antenna elements, user signal output unit, calibration signal generation unit, antenna signal processing unit, and total transmission power measuring unit. The user signal output unit weights a user signal by an antenna weight and outputs it to each antenna element. The calibration signal generation unit outputs a calibration signal to be used to detect the characteristic of a transmission path. The antenna signal processing unit provided in the transmission path executes spread modulation and multiplexing for the user signal and calibration signal and outputs a multiplexed signal. The total transmission power measuring unit measures the value of total transmission power of the multiplexed signal to be transmitted from each antenna element on the basis of the multiplexed signal input from the antenna signal processing unit. An antenna weight correction unit executes a correction operation on the basis of the total transmission power value.

11 Claims, 9 Drawing Sheets

U.S. PATENT DOCUMENTS

| | | | |
|---|---|---|---|
| 2004/0246048 A1* | 12/2004 | Leyonhjelm et al. | 330/2 |
| 2005/0018597 A1* | 1/2005 | Yuda et al. | 370/208 |
| 2005/0219118 A1* | 10/2005 | Kubo et al. | 342/174 |
| 2005/0239419 A1* | 10/2005 | Fudaba et al. | 455/101 |
| 2006/0273959 A1* | 12/2006 | Kawasaki | 342/368 |
| 2007/0030882 A1* | 2/2007 | Zeira et al. | 375/130 |
| 2007/0138277 A1* | 6/2007 | Kazama et al. | 235/439 |

FOREIGN PATENT DOCUMENTS

| | | |
|---|---|---|
| EP | 1 335 450 A1 | 8/2003 |
| JP | 10-336149 | 12/1998 |
| WO | WO-2004/012346 A2 | 2/2004 |

\* cited by examiner

TRANSMITTING APPARATUS EMPLOYING ONLINE CALIBRATION

BACKGROUND OF THE INVENTION

The present invention relates to a transmitting apparatus using at least two antenna elements, which executes communication while forming a transmission beam by weighting user signal data (code, rate, frequency, or transmission power) transmitted from each antenna element by an antenna weight and, more particularly, to a transmitting apparatus which has a calibration function of correcting an antenna weight in accordance with the characteristic of a transmission path in the apparatus. The user signal data will simply be referred to as a "user signal" hereinafter.

In, e.g., a cellular mobile communication system, a scheme using adaptive antenna control has been examined aiming at an increase in signal speed/quality and subscriber capacity. According to the adaptive antenna control technique, in an array antenna including three or more antenna elements with very high correlation, a transmission beam pattern is formed by controlling at least one of the phase and amplitude (to be referred to as "phase/amplitude" hereinafter) of a user signal transmitted from each antenna element by using the same frequency band, and directivity is applied in the arrival direction of a desired signal, or null is formed for an interference signal.

In an array antenna transmitting/receiving apparatus having a plurality of transmission paths connected to the respective antenna elements, generally, no ideal transmission directivity pattern can be formed because of the frequency characteristic (phase and amplitude) in constituent elements (including cables) on each transmission path, characteristic variations caused by a temperature or humidity fluctuation, and variations such as a secular change. For this reason, in forming a transmission directivity pattern, variations in phase and amplitude caused by the above-described factors must be compensated for. This operation is called calibration. Calibration includes online calibration and offline calibration. In the former, calibration is executed even during operation of the apparatus, and an updated latest calibration coefficient is applied. In the latter, a calibration coefficient measured before the operation of the apparatus (at the time of installation or shipment) is applied even during the operation.

Conventionally, in the calibration method of the array antenna transmitting/receiving apparatus of this type, a known calibration signal is input to the radio transmitting unit connected to each antenna element, and variations in phase (delay) and amplitude (gain) of each transmission path, which vary every moment independently, are compensated for by using a result obtained by demodulating the calibration signal. The conventional calibration method will be described below in more detail with reference to FIGS. 8 to 11.

Figure 8:
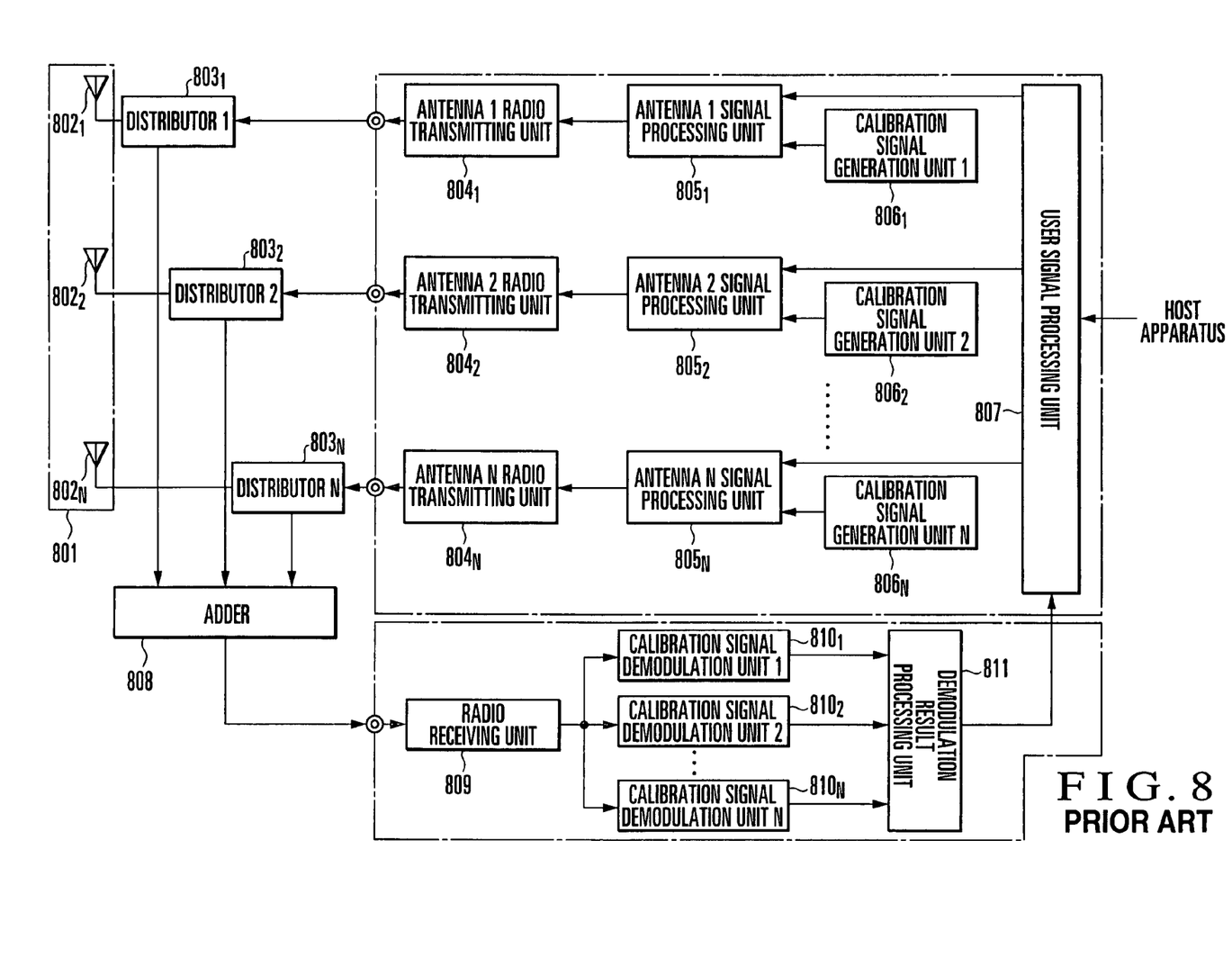
FIG. 8 is a block diagram showing an arrangement example of a conventional array antenna transmitting/receiving apparatus (online calibration)

FIG. 8 shows an arrangement example of a conventional array antenna transmitting/receiving apparatus which executes online calibration. This array antenna transmitting/receiving apparatus comprises an array antenna 801 including N antenna elements $802_1$ to $802_N$, distributor 1 $803_1$ to distributor N $803_N$, antenna 1 radio transmitting unit $804_1$ to antenna N radio transmitting unit $804_N$, antenna 1 signal processing unit $805_1$ to antenna N signal processing unit $805_N$, calibration signal generation unit 1 $806_1$ to calibration signal generation unit N $806_N$, user signal processing unit 807, adder 808, radio receiving unit 809, calibration signal demodulation unit 1 $810_1$ to calibration signal demodulation unit N $810_N$, and demodulation result processing unit 811.

In the array antenna 801, the N antenna elements $802_1$ to $802_N$ are arranged closely in an array. They can form a desired transmission directivity pattern by controlling the antenna weight (phase/amplitude) by the user signal processing unit 807. The number N of antenna elements is set to 3 or more to discriminate the antenna from a normal diversity arrangement.

The user signal processing unit 807 outputs user signals weighted by the antenna weight for the respective users to the antenna 1 signal processing unit $805_1$ to antenna N signal processing unit $805_N$.

The calibration signal generation unit 1 $806_1$ to calibration signal generation unit N $806_N$ generate calibration signals which are orthogonal to each other in all transmission paths in the baseband and output the signals to the antenna 1 signal processing unit $805_1$ to antenna N signal processing unit $805_N$, respectively.

The antenna 1 signal processing unit $805_1$ to antenna N signal processing unit $805_N$ receive the user signals output from the user signal processing unit 807 and the calibration signals output from the calibration signal generation unit 1 $806_1$ to calibration signal generation unit N $806_N$, execute spread modulation and multiplexing, and output the resultant multiplexed signals to the antenna 1 radio transmitting unit $804_1$ to antenna N radio transmitting unit $804_N$, respectively. The user signal and calibration signal code-multiplexed by each antenna signal processing unit are orthogonal to each other.

The antenna 1 radio transmitting unit $804_1$ to antenna N radio transmitting unit $804_N$ receive the multiplexed signals output from the antenna 1 signal processing unit $805_1$ to antenna N signal processing unit $805_N$, execute digital/analog conversion, quadrature modulation, frequency conversion from the baseband to radio frequency band, amplification, frequency band limitation, and the like for the multiplexed signals in the baseband, and output the signals to the distributor 1 $803_1$ to distributor N $803_N$, respectively.

The distributor 1 $803_1$ to distributor N $803_N$ receive the multiplexed signals output from the antenna 1 radio transmitting unit $804_1$ to antenna N radio transmitting unit $804_N$ and output the multiplexed signals to the antenna elements $802_1$ to $802_N$, respectively. The distributor 1 $803_1$ to distributor N $803_N$ also partially distribute the powers to the adder 808.

The adder 808 receives the multiplexed signals output from the distributor 1 $803_1$ to distributor N $803_N$, combines the multiplexed signals in the radio frequency band, and outputs the signal to the radio receiving unit 809.

The radio receiving unit 809 receives the multiplexed signal output from the adder 808, executes frequency band limitation, amplification, frequency conversion from the radio frequency band to baseband, quadrature demodulation, analog/digital conversion, and the like, and outputs the signal to the calibration signal demodulation unit 1 $810_1$ to calibration signal demodulation unit N $810_N$.

The calibration signal demodulation unit 1 $810_1$ to calibration signal demodulation unit N $810_N$ receive the multiplexed signal output from the radio receiving unit 809 and extract, from the multiplexed signal, the calibration signals in the transmission paths 1 to N. More specifically, the calibration signal demodulation unit 1 $810_1$ extracts the calibration signal generated by the calibration signal generation unit 1 $806_1$. Similarly, the calibration signal demodulation unit 2 $810_2$ to calibration signal demodulation unit N $810_N$ extract the calibration signals generated by the calibration signal generation unit 2 $806_2$ to calibration signal generation unit N $806_N$, respectively. As described above, the calibration signals are orthogonal to each other. Hence, they can be extracted by despreading the multiplexed signal.

The calibration signal demodulation unit 1 $810_1$ to calibration signal demodulation unit N $810_N$ detect transmission path 1 demodulation symbol point (phase/amplitude information) to transmission path N demodulation symbol point (phase/amplitude information) from the extracted calibration signals. The transmission path 1 demodulation symbol point is added the phase/amplitude variation of the transmission path including the antenna 1 radio transmitting unit $804_1$. This also applies to the transmission path 2 demodulation symbol point to transmission path N demodulation symbol point. The detected transmission path 1 demodulation symbol point to transmission path N demodulation symbol point are output to the demodulation result processing unit 811.

The demodulation result processing unit 811 receives the transmission path 1 demodulation symbol point to transmission path N demodulation symbol point output from the calibration signal demodulation unit 1 $810_1$ to calibration signal demodulation unit N $810_N$, calculates calibration coefficients as the correction information of the respective transmission paths from these demodulation symbol points, and outputs the calibration coefficients to the user signal processing unit 807. More specifically, the calibration coefficients are calculated in the following way.

Figure 9:
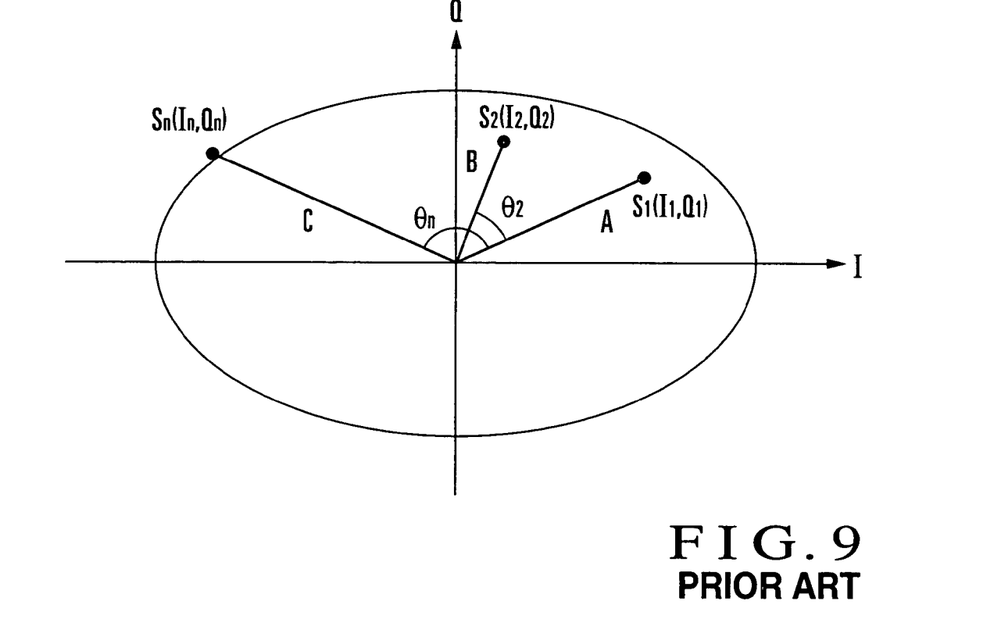
FIG. 9 is a view for explaining the calibration coefficient calculation method by a demodulation result processing unit shown in FIG. 8 (before normalization)
Figure 10:
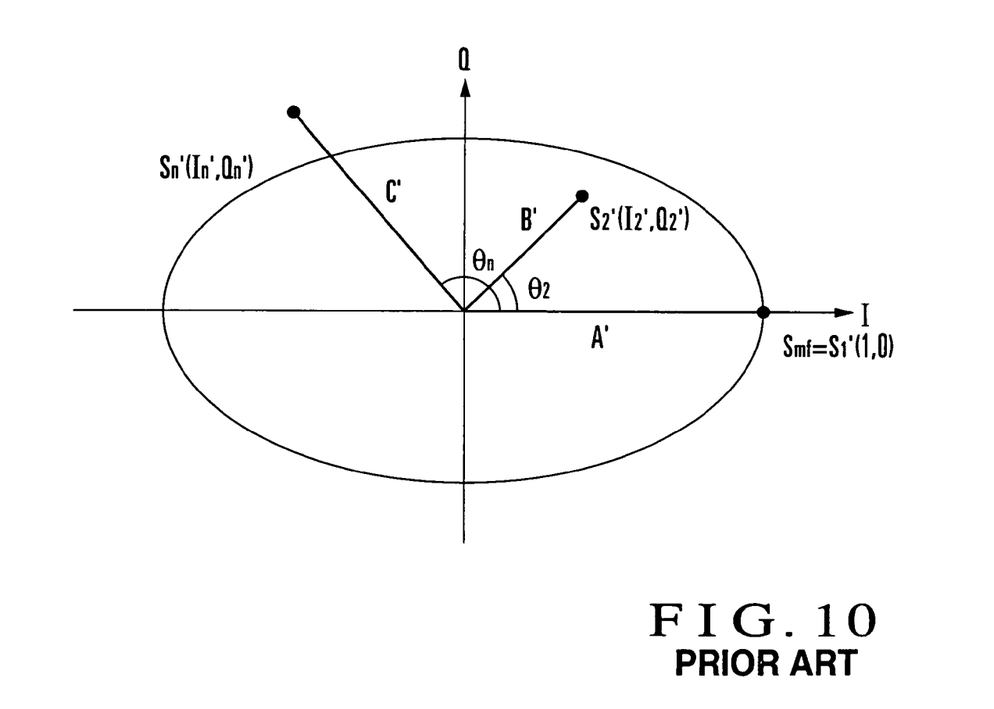
FIG. 10 is a view for explaining the calibration coefficient calculation method by the demodulation result processing unit shown in FIG. 8 (after normalization)

It is defined that the transmission path including the antenna 1 radio transmitting unit $804_1$ is always the reference route. The calibration signal generated by the calibration signal generation unit 1 $806_1$ is demodulated by the calibration signal demodulation unit 1 $810_1$. The obtained symbol point is defined as a reference symbol point $S_1$, as shown in FIG. 9. The symbol point generated by the calibration signal generation unit 2 $806_2$ and demodulated by the calibration signal demodulation unit 2 $810_2$ is defined as $S_2$. The symbol point generated by the calibration signal generation unit N $806_N$ and demodulated by the calibration signal demodulation unit N $810_N$ is defined as $S_n$. The demodulation result processing unit 811 detects a phase difference $\theta_2$ and amplitude ratio $r_2$=B/A between $S_1$ and $S_2$ and a phase difference $\theta_n$ and amplitude ratio $r_n$=C/A between $S_1$ and $S_n$. When normalization with respect to the reference symbol point $S_1$ is done, the symbol points can be expressed, as shown in FIG. 10. At this time, $r_2$ to B/A=B'/1, and $r_n$=C/A=C'/1 although the values of the phase differences $\theta_2$ and $\theta_n$ and the amplitude ratios $r_2$ and $r_n$ do not change. The demodulation result processing unit 811 outputs the values $\theta_2$ to $\theta_n$ and $r_2$ to $r_n$ to the user signal processing unit 807 as calibration coefficients for each calibration period.

The user signal processing unit 807 corrects the user signals, which have undergone antenna weight (phase/amplitude) control for the respective users, by using the calibration coefficients output from the demodulation result processing unit 811.

Even when the phase/amplitude varies in the transmission paths during the operation of the apparatus, this array antenna transmitting/receiving apparatus can correct the generated phase/amplitude variation by giving the calibration coefficients to the user signal processing unit 807. When the user signals which form a transmission directivity pattern by antenna weight (phase/amplitude) control are transmitted after correction of the phase/amplitude variation in the transmission paths, an accurate transmission directivity pattern can be formed (e.g., Japanese Patent Laid-Open No. 10-336149).

Figure 11:
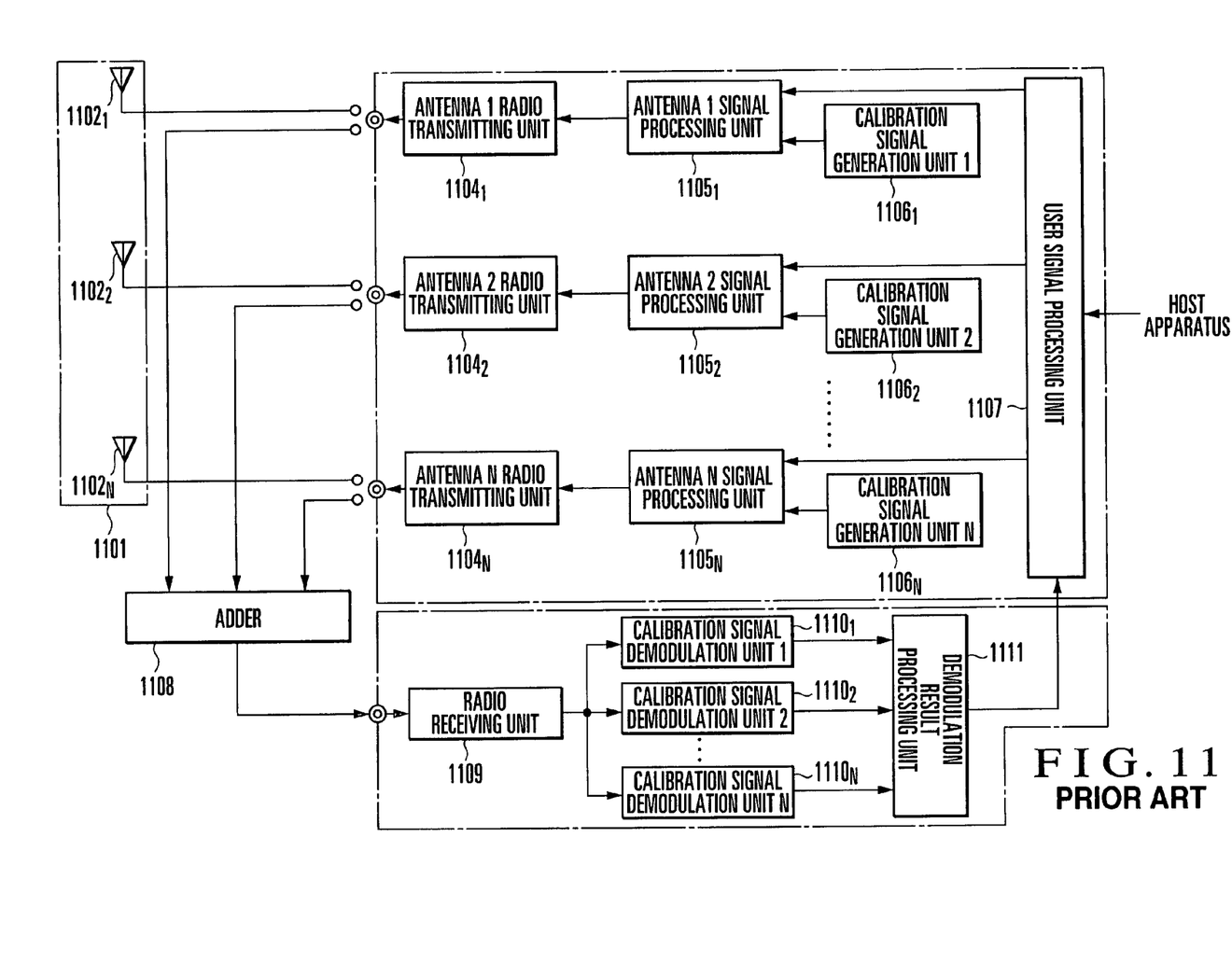
FIG. 11 is a block diagram showing another arrangement example of the conventional array antenna transmitting/receiving apparatus (offline calibration).

FIG. 11 shows an arrangement example of a conventional array antenna transmitting/receiving apparatus which executes offline calibration. This array antenna transmitting/receiving apparatus comprises an array antenna 1101 including N antenna elements $1102_1$ to $1102_N$, antenna 1 radio transmitting unit $1104_1$ to antenna N radio transmitting unit $1104_N$, antenna 1 signal processing unit $1105_1$ to antenna N signal processing unit $1105_N$, calibration signal generation unit 1 $1106_1$ to calibration signal generation unit N $1106_N$, user signal processing unit 1107, adder 1108, radio receiving unit 1109, calibration signal demodulation unit 1 $1110_1$ to calibration signal demodulation unit N $1110_N$, and demodulation result processing unit 1111.

When the calibration coefficients in the apparatus are to be measured at the time of installation or shipment of the apparatus, the arrangement from the adder 1108 is connected to the antenna 1 radio transmitting unit $1104_1$ to antenna N radio transmitting unit $1104_N$. In operation of the apparatus, the arrangement is disconnected from the antenna 1 radio transmitting unit $1104_1$ to antenna N radio transmitting unit $1104_N$, and instead, the array antenna 1101 is connected.

The calibration coefficients measured at the time of installation of the apparatus are stored in the user signal processing unit 1107. An effect to transmission directivity pattern formation can be obtained by adding the calibration coefficient to the antenna weight even during the operation. This calibration method is effective especially for an apparatus which shares the local signal or operation clock to be supplied to all antenna radio transmitting units because the influence of the local signal as the dominant factor of the phase variation is invisible.

However, in the conventional array antenna transmitting/receiving apparatus shown in FIG. 8, calibration is always executed during operation. Hence, the calibration signal as an unnecessary radio wave for the user signal is continuously transmitted. In addition, the spreading devices equal in number to the antenna elements always operate. This suppresses the remaining system capacity of carrier power in each transmission path.

In this array antenna transmitting/receiving apparatus, the calibration signals transmitted from all the antenna radio transmitting units at the same time are demodulated at a short period to calculate the calibration coefficients. Since this requires high-speed arithmetic processing, the load of signal processing is large.

In this array antenna transmitting/receiving apparatus, the calibration signal with the same power is always multiplexed and transmitted with respect to the user signal whose set power increases or decreases. As a result, the calibration signal looks like interference for the user signal more than necessary, and the calibration accuracy is low.

In the conventional array antenna transmitting/receiving apparatus shown in FIG. 11, the calibration coefficient measured at the time of installation or shipment is used even in executing calibration during the operation. For this reason, the information of total transmission power information as one of the major factors of the phase/amplitude variation in the transmission path is not fed back. Hence, correction cannot be done in consideration of the saturation characteristic in the constituent element in the transmission path. As a result, accurate calibration is impossible.

Problems of calibration of an array antenna transmitting/receiving apparatus using adaptive antenna control have been described above. However, even calibration of a transmitting apparatus which executes transmission diversity has the same problems. Transmission diversity is a technique of increasing the terminal reception quality by executing transmission from two antenna elements of a radio base station transmitting apparatus, which are arranged almost without correlation, by using the same frequency band and controlling the phase/amplitude of the user signal transmitted from each antenna element.

SUMMARY OF THE INVENTION

It is a principal object of the present invention to implement, in a transmitting apparatus which forms a transmission directivity pattern by weighting an antenna weight, online (during operation) transmission path calibration to adjust the calibration execution timing in consideration of the remaining system capacity.

It is another object of the present invention to implement, in a transmitting apparatus which forms a transmission directivity pattern by weighting an antenna weight, online (during operation) transmission path calibration to reduce the load of signal processing by adjusting the calibration frequency.

It is still another object of the present invention to implement, in a transmitting apparatus which forms a transmission directivity pattern by weighting an antenna weight, online (during operation) transmission path calibration to optimize the set power of a calibration signal with respect to a user signal.

It is still another object of the present invention to implement, in a transmitting apparatus which forms a transmission directivity pattern by weighting an antenna weight, offline (before operation) transmission path calibration in consideration of the saturation characteristic in the constituent element in the transmission path.

In order to achieve the above objects, according to the present invention, there is provided a transmitting apparatus comprising a plurality of antenna elements, user signal output means for weighting a user signal by an antenna weight and outputting the user signal to each of the antenna elements, calibration signal generation means for outputting a calibration signal to be used to detect a characteristic of a transmission path, antenna signal processing means, provided in the transmission path, for executing spread modulation and multiplexing for the user signal input from the user signal output means and the calibration signal input from the calibration signal generation means and outputting an obtained multiplexed signal, and total transmission power measuring means for measuring a value of total transmission power of the multiplexed signal to be transmitted from each of the antenna elements on the basis of the multiplexed signal input from the antenna signal processing means, wherein antenna weight correction means executes a correction operation on the basis of the value of the total transmission power.

DESCRIPTION OF THE PREFERRED EMBODIMENTS

The embodiments of the present invention will be described next in detail with reference to the accompanying drawings. A form to execute adaptive antenna control will be described below.

First Embodiment

Figure 1:
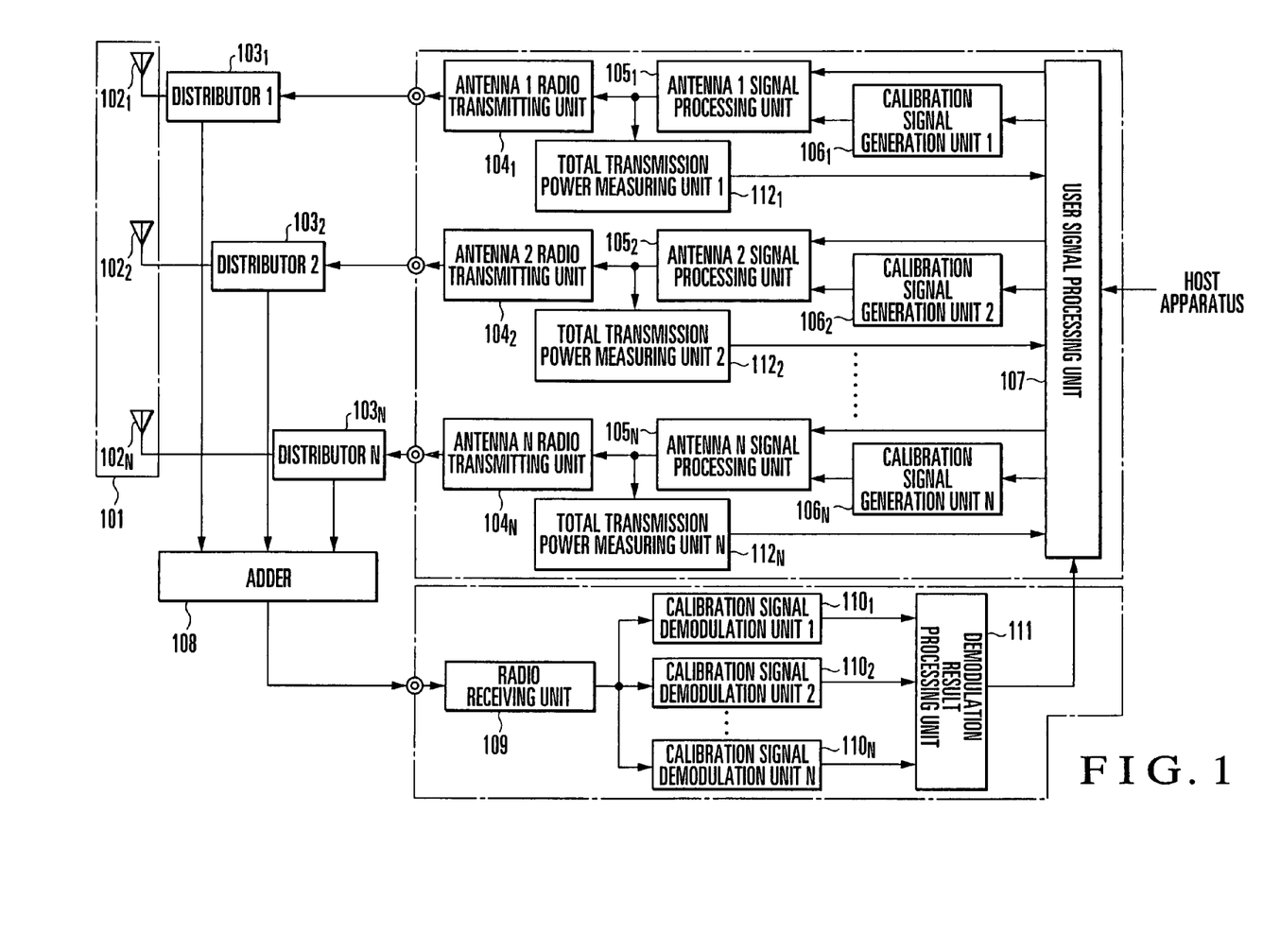
FIG. 1 is a block diagram showing the arrangement of an array antenna transmitting/receiving apparatus according to the first embodiment of the present invention (online calibration)

FIG. 1 shows the arrangement of an array antenna transmitting/receiving apparatus according to the first embodiment of the present invention. This array antenna transmitting/receiving apparatus has a function of executing online calibration. More specifically, the array antenna transmitting/receiving apparatus comprises an array antenna 101 including N antenna elements $102_1$ to $102_N$, distributor 1 $103_1$ to distributor N $103_N$, antenna 1 radio transmitting unit $104_1$ to antenna N radio transmitting unit $104_N$, antenna 1 signal processing unit $105_1$ to antenna N signal processing unit $105_N$, calibration signal generation unit 1 $106_1$ to calibration signal generation unit N $106_N$, user signal processing unit 107, adder 108, radio receiving unit 109, calibration signal demodulation unit 1 $110_1$ to calibration signal demodulation unit N $110_N$, demodulation result processing unit 111, and total transmission power measuring unit 1 $112_1$ to total transmission power measuring unit N $112_N$. The transmission path including the antenna 1 radio transmitting unit $104_1$ will be defined as a transmission path 1. Similarly, the transmission paths including the antenna 2 radio transmitting unit $104_2$ to antenna N radio transmitting unit $104_N$ will be defined as transmission paths 2 to N.

In the array antenna 101, the N antenna elements $102_1$ to $102_N$ are arranged closely in an array such that the correlation between them becomes high. They can form a desired transmission directivity pattern by controlling the antenna weight (phase/amplitude) by the user signal processing unit 107. The number N of antenna elements is set to 3 or more to discriminate the antenna from a normal diversity arrangement.

The user signal processing unit 107 outputs user signals weighted by the antenna weight for the respective users to the antenna 1 signal processing unit $105_1$ to antenna N signal processing unit $105_N$. The user signal processing unit 107 also corrects the antenna weight by using a calibration coefficient output from the demodulation result processing unit 111, as will be described later. The user signal processing unit 107 also determines whether to execute calibration, on the basis of the total transmission power values output from the total transmission power measuring unit 1 $112_1$ to total transmission power measuring unit N $112_N$. Only when calibration is to be executed, the calibration execution timing and the set power of the calibration signal are output to the calibration signal generation unit 1 $106_1$ to calibration signal generation unit N $106_N$. The user signal processing unit 107 will be described later in detail.

The calibration signal generation unit 1 $106_1$ to calibration signal generation unit N $106_N$ generate calibration signals in accordance with the execution timing and set power designated from the user signal processing unit 107 and output the calibration signals to the antenna 1 signal processing unit $105_1$ to antenna N signal processing unit $105_N$, respectively. The calibration signal generation units generate the calibration signals which are orthogonal to each other in all the transmission paths 1 to N in the baseband.

The antenna 1 signal processing unit $105_1$ to antenna N signal processing unit $105_N$ receive the user signals output from the user signal processing unit 107 and the calibration signals output from the calibration signal generation unit 1 $106_1$ to calibration signal generation unit N $106_N$, execute spread modulation and multiplexing, and output the resultant multiplexed signals to the antenna 1 radio transmitting unit $104_1$ to antenna N radio transmitting unit $104_N$ and the total transmission power measuring unit 1 $112_1$ to total transmission power measuring unit N $112_N$, respectively.

The user signal and calibration signal code-multiplexed by each antenna signal processing unit are orthogonal to each other. Both the user signals and calibration signals are input in executing calibration. However, only the user signals are input when calibration is not to be executed.

The antenna 1 radio transmitting unit $104_1$ to antenna N radio transmitting unit $104_N$ receive the multiplexed signals output from the antenna 1 signal processing unit $105_1$ to antenna N signal processing unit $105_N$, execute digital/analog conversion, quadrature modulation, frequency conversion from the baseband to radio frequency band, amplification, frequency band limitation, and the like for the multiplexed signals in the baseband, and output the signals to the distributor 1 $103_1$ to distributor N $103_N$, respectively.

The total transmission power measuring unit 1 $112_1$ to total transmission power measuring unit N $112_N$ receive the multiplexed signals output from the antenna 1 signal processing unit $105_1$ to antenna N signal processing unit $105_N$, measure the values of total transmission powers of the multiplexed signals transmitted from the antenna elements $102_1$ to $102_N$ in the respective transmission paths, and output the measured values to the user signal processing unit 107.

The distributor 1 $103_1$ to distributor N $103_N$ receive the multiplexed signals as the outputs from the antenna 1 radio transmitting unit $104_1$ to antenna N radio transmitting unit $104_N$. The distributor 1 $103_1$ to distributor N $103_N$ output most powers of the multiplexed signals to the antenna elements $102_1$ to $102_N$, respectively, and also partially distribute the powers to the adder 108.

The adder 108 receives the multiplexed signals output from the distributor 1 $103_1$ to distributor N $103_N$, combines the multiplexed signals in the radio frequency band, and outputs the signal to the radio receiving unit 109. The calibration signals are multiplexed only in executing calibration. When calibration is not to be executed, only the user signal is output to the radio receiving unit 109.

The radio receiving unit 109 receives the multiplexed signal output from the adder 108, executes frequency band limitation, amplification, frequency conversion from the radio frequency band to baseband, quadrature demodulation, analog/digital conversion, and the like, and outputs the signal to the calibration signal demodulation unit 1 $110_1$ to calibration signal demodulation unit N $110_N$.

The calibration signal demodulation unit 1 $110_1$ to calibration signal demodulation unit N $110_N$ receive the multiplexed signal output from the radio receiving unit 109 and extract, from the multiplexed signal, the calibration signals in the transmission paths 1 to N. More specifically, the calibration signal demodulation unit 1 $110_1$ extracts the calibration signal generated by the calibration signal generation unit 1 $106_1$. Similarly, the calibration signal demodulation unit 2 $110_2$ to calibration signal demodulation unit N $110_N$ extract the calibration signals generated by the calibration signal generation unit 2 $106_2$ to calibration signal generation unit N $106_N$, respectively. As described above, the calibration signals are orthogonal to each other. Hence, they can be extracted by despreading the multiplexed signal.

The calibration signal demodulation unit 1 $110_1$ to calibration signal demodulation unit N $110_N$ detect transmission path 1 demodulation symbol point (phase/amplitude information) to transmission path N demodulation symbol point (phase/amplitude information) from the extracted calibration signals. The transmission path demodulation symbol point is added the phase/amplitude variation of the transmission path. The detected transmission path 1 demodulation symbol point to transmission path N demodulation symbol point are output to the demodulation result processing unit 111.

The demodulation result processing unit 111 receives the transmission path 1 demodulation symbol point to transmission path N demodulation symbol point output from the calibration signal demodulation unit 1 $110_1$ to calibration signal demodulation unit N $110_N$, calculates calibration coefficients as the correction information of the respective transmission paths from these demodulation symbol points, and outputs the calibration coefficients to the user signal processing unit 107. More specifically, the following processing is executed.

For the demodulation symbol points in all transmission paths, the demodulation result processing unit 111 normalizes the transmission path 2 demodulation symbol point to transmission path N demodulation symbol point as the demodulation results of the transmission paths 2 to N output from the calibration signal demodulation unit 2 $110_2$ to calibration signal demodulation unit N $110_N$ on the basis of the transmission path 1 demodulation symbol point as the demodulation result of the transmission path 1 output from the calibration signal demodulation unit 1 $110_1$, thereby obtaining phase (delay)/amplitude (gain) information. In this way, the demodulation result processing unit 111 outputs the normalized demodulation symbol points (phases/amplitudes) as the calibration coefficients to the user signal processing unit 107 for all calibration signals generated by the calibration signal generation unit 2 $106_2$ to calibration signal generation unit N $106_N$.

The demodulation symbol point in the transmission path 1 is used as a reference (I/Q)=(1,0) for normalization. Hence, no demodulation result need be output to the user signal processing unit 107. Examples of the transmission path 1 demodulation symbol point, transmission path 2 demodulation symbol point, and transmission path N demodulation symbol point before and after normalization are the same as in FIGS. 9 and 10.

Figure 2:
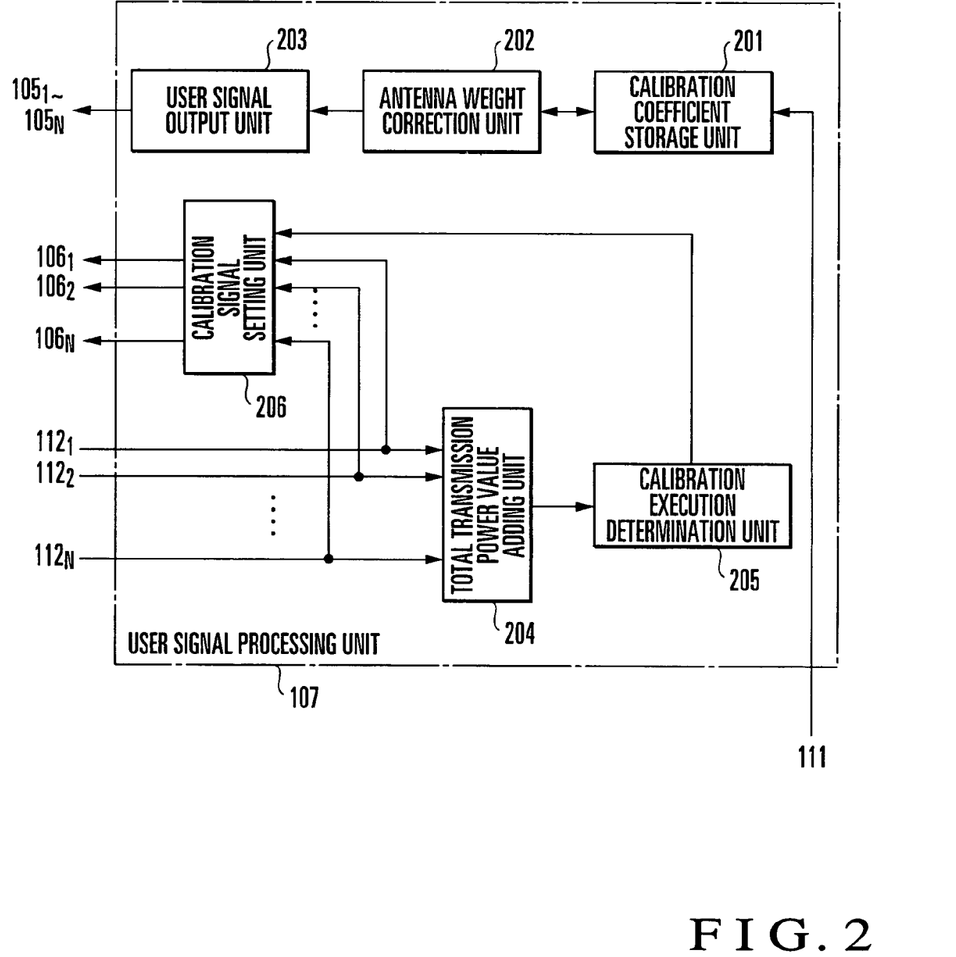
FIG. 2 is a block diagram showing the arrangement of a user signal processing unit shown in FIG. 1.

The user signal processing unit 107 will be described next in more detail with reference to FIG. 2. FIG. 2 shows the arrangement of the user signal processing unit 107. The same reference numerals as in FIG. 1 denote the same or corresponding constituent elements in FIG. 2.

The user signal processing unit 107 comprises a calibration coefficient storage unit 201, antenna weight correction unit 202, user signal output unit 203, total transmission power value adding unit 204, calibration execution determination unit 205, and calibration signal setting unit 206.

The calibration coefficient storage unit 201 stores the latest calibration coefficient for each transmission path, which is output from the demodulation result processing unit 111 when calibration is to be executed during the operation of the apparatus.

The antenna weight correction unit 202 corrects the antenna weight to weight the user signal in accordance with the phase/amplitude variation in each transmission path and outputs the corrected antenna weight to the user signal output unit 203. More specifically, for each period to set the antenna weight again, the latest calibration coefficient is read out from the calibration coefficient storage unit 201. The readout calibration coefficient is added to the antenna weight, thereby correcting the antenna weight. Even when calibration is not executed newly, the antenna weight is corrected by using the calibration coefficient stored in the calibration coefficient storage unit 201.

The user signal output unit 203 weights each user signal by using the antenna weight corrected by the antenna weight correction unit 202 and outputs the user signals to the antenna 1 signal processing unit $105_1$ to antenna N signal processing unit $105_N$.

With this arrangement, even when a phase/amplitude variation occurs in each transmission path during the operation of the apparatus, the generated phase/amplitude variation can be removed by correcting the antenna weight by using the calibration coefficient. As a result, an accurate transmission directivity pattern can be formed at the antenna terminal.

The total transmission power value adding unit 204 adds the values of the total transmission powers output from the total transmission power measuring unit 1 $112_1$ to total transmission power measuring unit N $112_N$ to calculates the sum of the total transmission powers from all antenna elements. The calculated sum of total transmission powers is output to the calibration execution determination unit 205.

The calibration execution determination unit 205 determines on the basis of the value of the maximum transmission power of the array antenna transmitting/receiving apparatus and the sum of total transmission powers calculated by the total transmission power value adding unit 204 whether to execute calibration, i.e., whether to cause the calibration signal generation unit 1 $106_1$ to calibration signal generation unit N $106_N$ to output calibration signals.

For example, the "sum of total transmission powers" is subtracted from the "value of the maximum transmission power of the apparatus" to calculate the remaining system capacity. The calculated remaining system capacity is compared with a preset threshold value. If the remaining system capacity is larger than the threshold value, it is determined that calibration should be executed.

Alternatively, the "sum of total transmission powers" is divided by the "value of the maximum transmission power of the apparatus" to calculate the sum of utilization ratios of the carrier power. The calculated sum of utilization ratios is compared with a preset threshold value. If the sum of utilization ratios is smaller than the threshold value, it is determined that calibration should be executed. The latter case will be described in detail by using a detailed example.

For example, assume that the maximum transmission power of the apparatus is 20 W, and the number of antenna elements of the array antenna 101 is 4. When the measured value of the total transmission power output from the total transmission power measuring unit 1 $112_1$ to the user signal processing unit 107 is 3.2 W, the carrier power utilization ratio is 16%. When the measured values by the total transmission power measuring unit 2 $112_2$ to total transmission power measuring unit 4 $112_4$ are 1.8 W, 2.8 W, and 4.5 W, respectively, the carrier power utilization ratios are 9%, 14%, and 22.5%, respectively.

Hence, the sum of carrier power utilization ratios is 61.5%. The threshold value to the sum of carrier power utilization ratios is set to 60%. Since the sum of carrier power utilization ratios exceeds the threshold value, the calibration execution determination unit 205 determines that no calibration is to be executed. When the carrier power utilization ratios decrease then, and the sum of them becomes smaller than the threshold value, the calibration execution determination unit 205 determines that calibration should be executed.

When the calibration execution determination unit 205 determines that calibration should be executed, the calibration signal setting unit 206 determines the calibration signal output timing and outputs the result to the calibration signal generation unit 1 $106_1$ to calibration signal generation unit N $106_N$. The calibration signal generation unit 1 $106_1$ to calibration signal generation unit N $106_N$ output calibration signals at the timing designated by the calibration signal setting unit 206. Then, calibration is executed. For this reason, the calibration can be prevented from suppressing the remaining system capacity of carrier power. In addition, since the calibration frequency becomes low, the load of signal processing can be reduced.

The calibration signal setting unit 206 also determines the set power of each calibration signal together with the calibration signal output timing and outputs the result to the calibration signal generation unit 1 $106_1$ to calibration signal generation unit N $106_N$. The set powers of the calibration signals are determined on the basis of the measured values of total transmission powers output from the total transmission power measuring unit 1 $112_1$ to total transmission power measuring unit N $112_N$. For example, the power of the calibration signal is set lower by 20 dB with respect to the measured value of the total transmission power in each transmission path. With this setting, even when the set power of the user signal increases or decreases, the power ratio of the user signal to the calibration signal can always be kept constant. Hence, the calibration signal can be prevented from looking like interference for the user signal more than necessary, and the calibration accuracy can be prevented from being low.

Second Embodiment

A modification to the first embodiment will be described next. In the first embodiment, in the user signal processing unit 107, the threshold value for the sum of carrier power utilization ratios is set, and execution of calibration is determined. Instead, execution of calibration may be determined by setting an arbitrary threshold value for the carrier power utilization ratio in each transmission path. The carrier power utilization ratio in each transmission path is obtained by dividing the value of total transmission power in the transmission path, which is output from a corresponding one of the total transmission power measuring unit 1 $112_1$ to total transmission power measuring unit N $112_N$, by the value of maximum transmission power transmittable from the transmission path. When a threshold value is set for each transmission path, the arrangement can also cope with a system which transmits a control channel from only an arbitrary antenna element.

Figure 3:
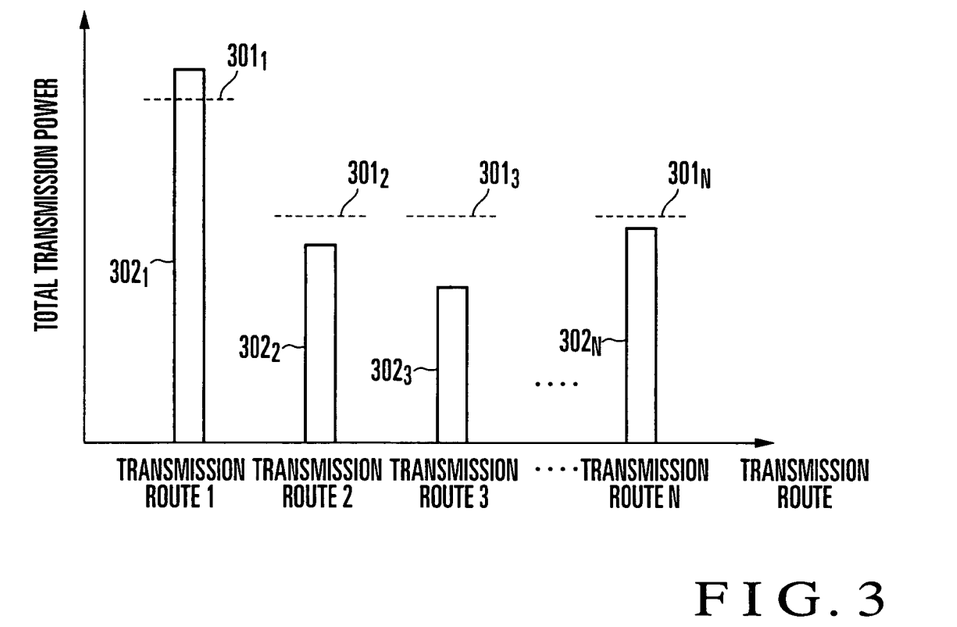
FIG. 3 is a graph showing the relationship between the set threshold value and the total transmission power measured value in each transmission path (when calibration is not executed)
Figure 4:
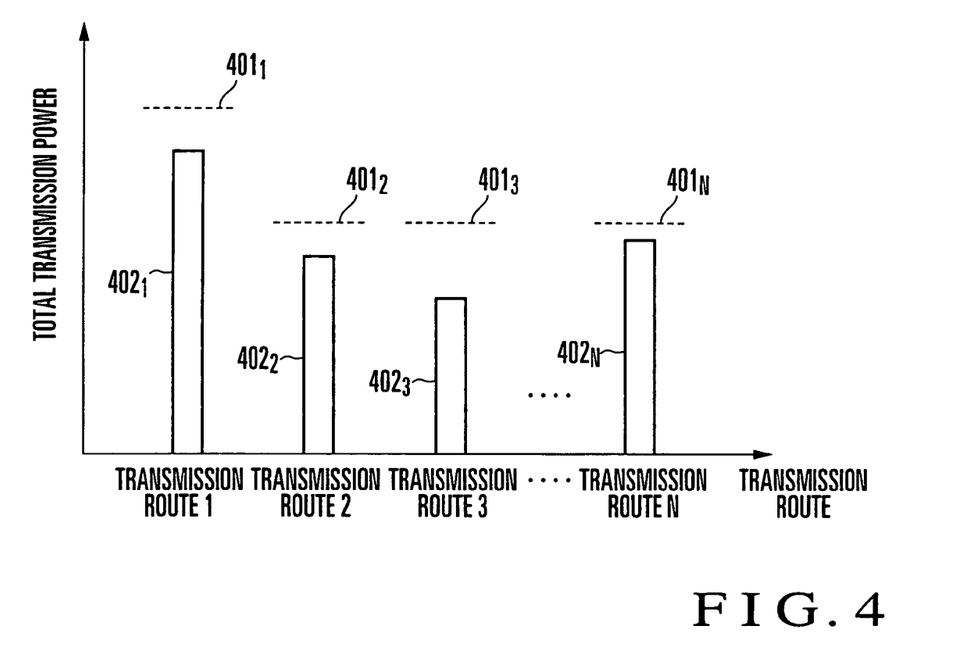
FIG. 4 is a graph showing the relationship between the set threshold value and the total transmission power measured value in each transmission path (when calibration is executed)

FIGS. 3 and 4 show the relationship between the set threshold value and the total transmission power in each transmission path.

Referring to FIG. 3, the threshold value for the transmission path 1 is represented by $301_1$, and the threshold values for the transmission paths 2 to N are represented by $301_2$ to $302_N$. The measured value by the total transmission power measuring unit 1 $112_1$ in the transmission path 1 is represented by $302_1$, and the measured values by the total transmission power measuring units 2 $112_2$ to total transmission power measuring unit N $112_N$ in the transmission paths 2 to N are represented by $302_2$ to $302_N$.

In this example, only the threshold value for the transmission path 1 is set larger than those of the remaining transmission paths 2 to N. In this example, since the measured value $302_1$ of the total transmission power in the transmission path 1 exceeds the threshold value $301_1$, it is determined that no calibration is to be executed.

Referring to FIG. 4, the threshold value for the transmission path 1 is represented by $401_1$, and the threshold values for the transmission paths 2 to N are represented by $401_2$ to $402_N$. The measured value by the total transmission power measuring unit 1 $112_1$ in the transmission path 1 is represented by $402_1$, and the measured values by the total transmission power measuring units 2 $112_2$ to total transmission power measuring unit N $112_N$ in the transmission paths 2 to N are represented by $402_2$ to $402_N$.

In this example, the measured values $402_1$ to $402_N$ of total transmission powers in all the transmission paths 1 to N are smaller than the threshold values $401_1$ to $401_N$. Hence, it is determined that calibration is to be executed.

In this way, when the threshold value in each transmission path is arbitrarily set, the frequency of calibration execution can be adjusted. More specifically, when the threshold value is high, calibration is executed frequently. When the threshold value is low, calibration is executed only when the carrier power utilization ratio (system capacity) in each transmission path has a margin, calibration is executed.

Third Embodiment

Figure 5:
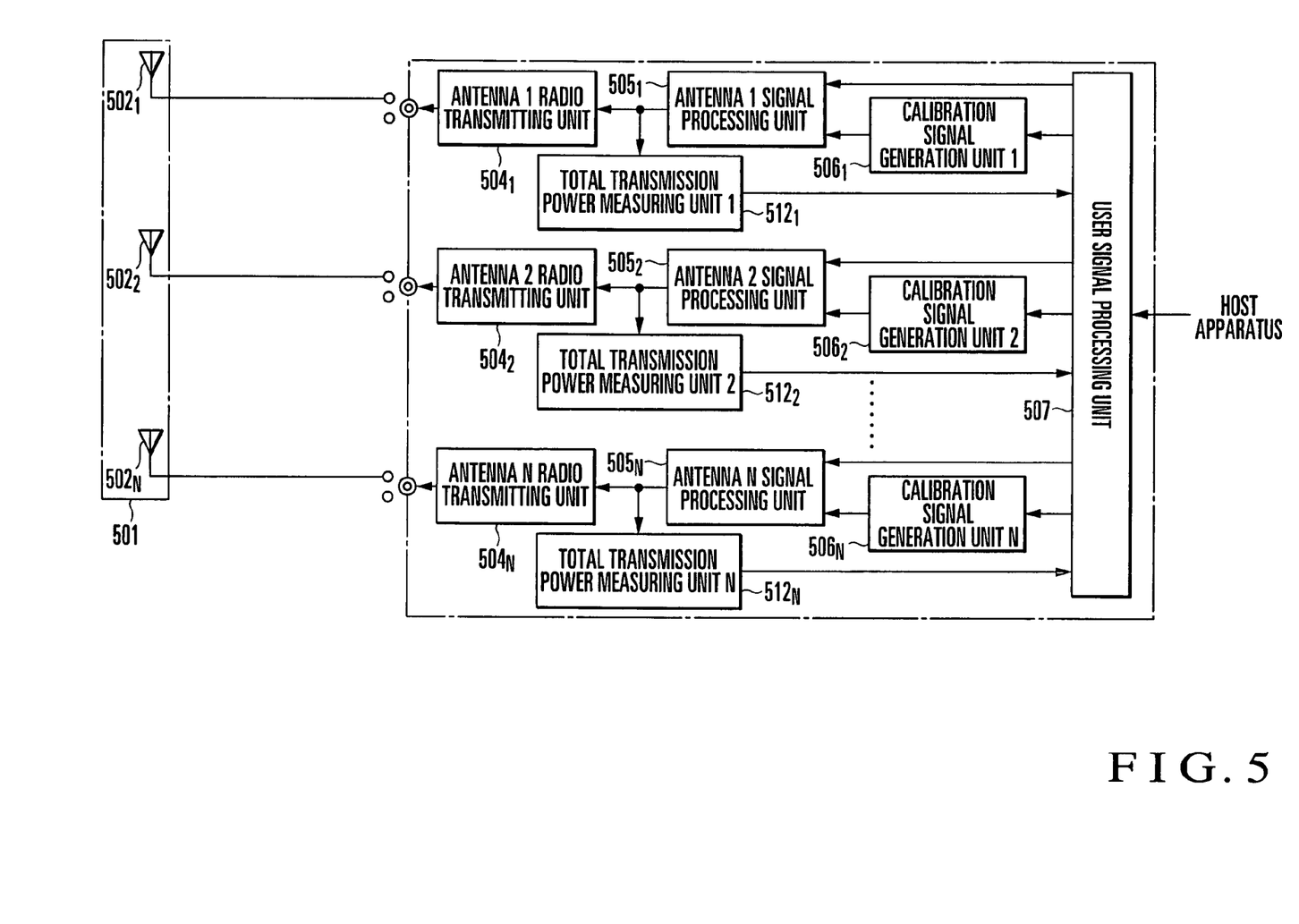
FIG. 5 is a block diagram showing the arrangement of an array antenna transmitting/receiving apparatus according to the third embodiment of the present invention (offline calibration)

FIG. 5 shows the arrangement of an array antenna transmitting/receiving apparatus according to the third embodiment of the present invention.

This array antenna transmitting/receiving apparatus has a function of executing offline calibration. More specifically, the array antenna transmitting/receiving apparatus comprises an array antenna 501 including N antenna elements $502_1$ to $502_N$, antenna 1 radio transmitting unit $504_1$ to antenna N radio transmitting unit $504_N$, antenna 1 signal processing unit $505_1$ to antenna N signal processing unit $505_N$, calibration signal generation unit 1 $506_1$ to calibration signal generation unit N $506_N$, user signal processing unit 507, and total transmission power measuring unit 1 $512_1$ to total transmission power measuring unit N $512_N$. The transmission path including the antenna 1 radio transmitting unit $504_1$ will be defined as a transmission path 1. Similarly, the transmission paths including the antenna 2 radio transmitting unit $504_2$ to antenna N radio transmitting unit $504_N$ will be defined as transmission paths 2 to N.

In the array antenna 501, the N antenna elements $502_1$ to $502_N$ are arranged closely in an array such that the correlation between them becomes high. The number N of antenna elements is set to 3 or more to discriminate the antenna from a normal diversity arrangement.

The user signal processing unit 507 outputs user signals weighted by the antenna weight for the respective users to the antenna 1 signal processing unit $505_1$ to antenna N signal processing unit $505_N$. To measure a calibration coefficient before the operation of the apparatus (at the time of installation or shipment), the user signal processing unit 507 outputs the calibration signal output timing and set power to the calibration signal generation unit 1 $506_1$ to calibration signal generation unit N $506_N$. The user signal processing unit 507 stores the obtained calibration coefficient and corrects the antenna weight by using the calibration coefficient. The user signal processing unit 507 will be described later in detail.

The calibration signal generation unit 1 $506_1$ to calibration signal generation unit N $506_N$ generate calibration signals in accordance with the timing and set power designated from the user signal processing unit 507 and output the calibration signals to the antenna 1 signal processing unit $505_1$ to antenna N signal processing unit $505_N$, respectively. Since calibration coefficient measurement is not executed during the operation of the apparatus, neither the calibration signal output timing nor the set power is input from the user signal processing unit 507.

The antenna 1 signal processing unit $505_1$ to antenna N signal processing unit $505_N$ receive the user signals output from the user signal processing unit 507 and the calibration signals output from the calibration signal generation unit 1 $506_1$ to calibration signal generation unit N $506_N$, execute spread modulation and multiplexing, and output the resultant multiplexed signals to the antenna 1 radio transmitting unit $504_1$ to antenna N radio transmitting unit $504_N$ and the total transmission power measuring unit 1 $512_1$ to total transmission power measuring unit N $512_N$, respectively. During the operation of the apparatus, no calibration signals are input, and only the user signals are input.

The antenna 1 radio transmitting unit $504_1$ to antenna N radio transmitting unit $504_N$ receive the multiplexed signals output from the antenna 1 signal processing unit $505_1$ to antenna N signal processing unit $505_N$, execute digital/analog conversion, quadrature modulation, frequency conversion from the baseband to radio frequency band, amplification, frequency band limitation, and the like for the multiplexed signals in the baseband, and output the signals to the antenna elements $502_1$ to $502_N$, respectively. During the operation of the apparatus, multiplexed signals containing only the user signals are input.

The total transmission power measuring unit 1 $512_1$ to total transmission power measuring unit N $512_N$ receive the multiplexed signals output from the antenna 1 signal processing unit $505_1$ to antenna N signal processing unit $505_N$, measure the values of total transmission powers of the multiplexed signals transmitted from the antenna elements $502_1$ to $502_N$ in the respective transmission paths, and output the measured values to the user signal processing unit 507.

Figure 6:
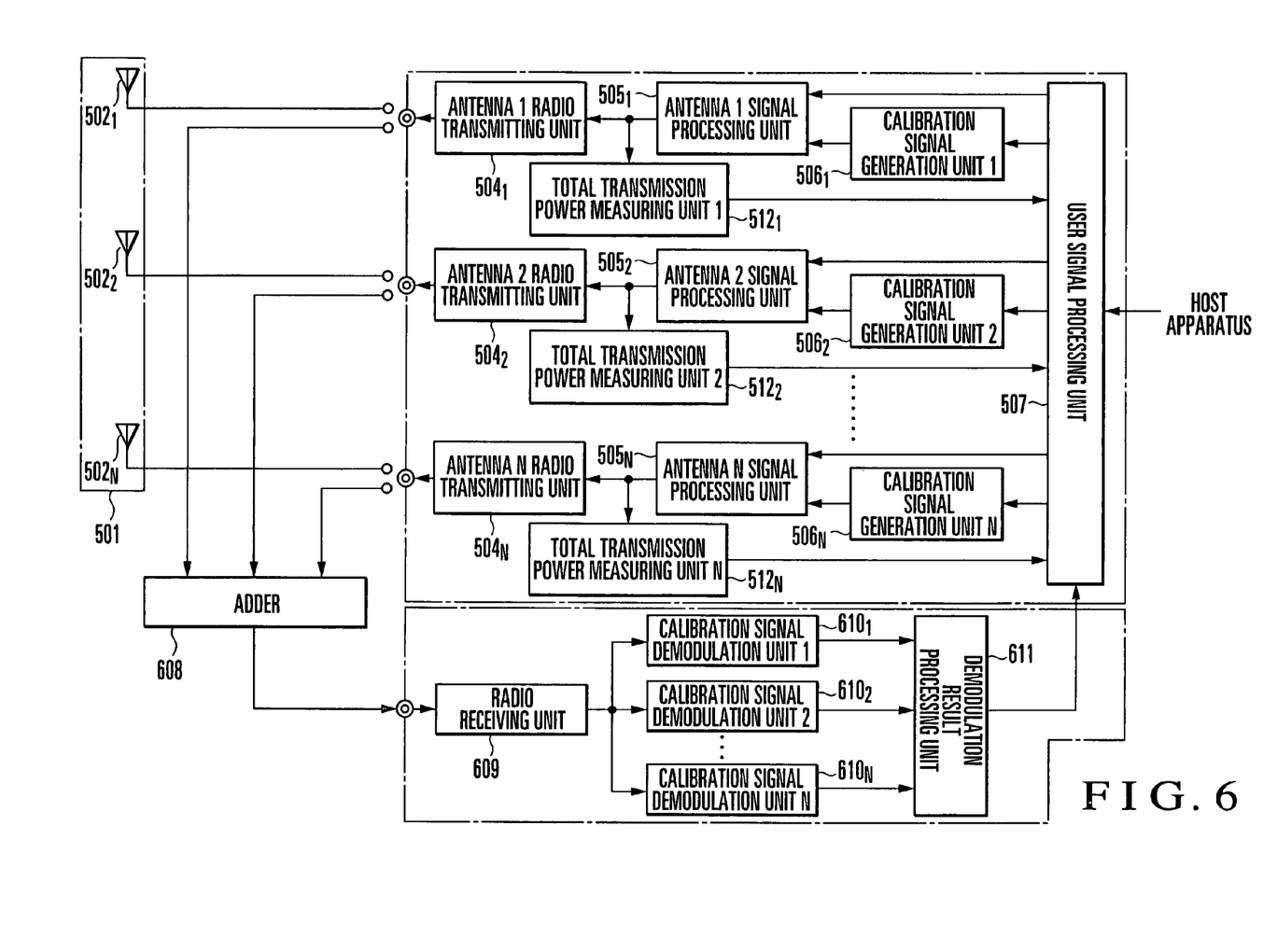
FIG. 6 is a block diagram showing an arrangement to measure the calibration coefficients before operation of the apparatus (offline)

FIG. 6 shows an arrangement to measure the calibration coefficients before operation of the apparatus (offline).

To measure the calibration coefficients, a calibration coefficient measuring apparatus including an adder 608, radio receiving unit 609, calibration signal demodulation unit 1 $610_1$ to calibration signal demodulation unit N $610_N$, and demodulation result processing unit 611 shown in FIG. 6 is connected to the array antenna transmitting/receiving apparatus shown in FIG. 5. Measurement is executed by the same method as in online calibration coefficient measurement (during operation) described in the first embodiment. In this arrangement, however, the values of total transmission powers and the values of transmission frequencies transmitted from the antenna elements $502_1$ to $502_N$ are changed variously, and the calibration coefficients are measured under the respective conditions.

Figure 7:
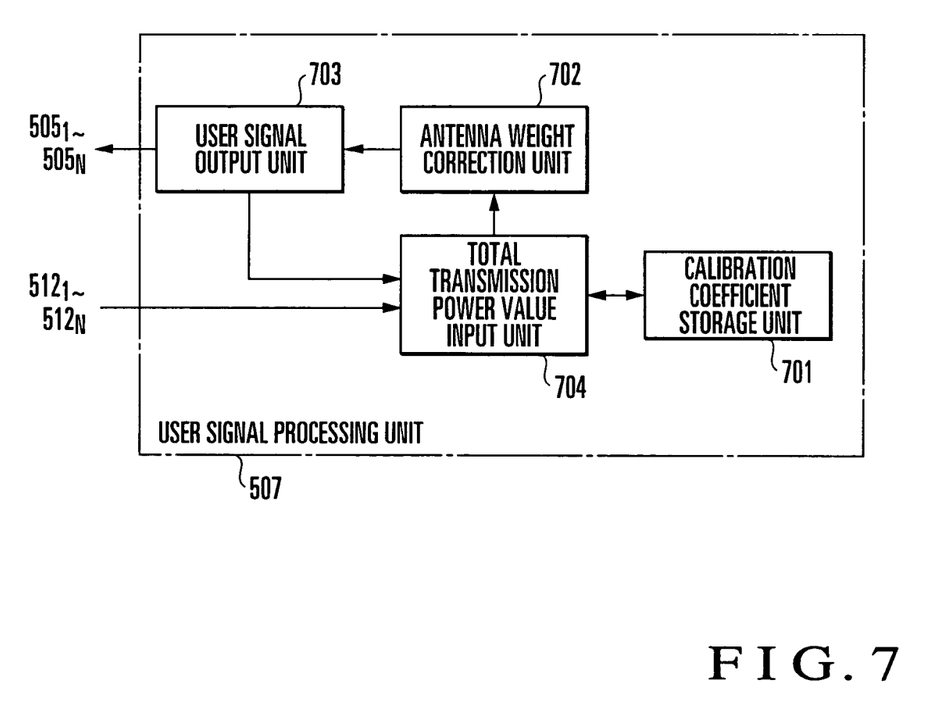
FIG. 7 is a block diagram showing the arrangement of a user signal processing unit shown in FIG. 5.

FIG. 7 shows the arrangement of the user signal processing unit 507 shown in FIG. 5. The same reference numerals as in FIG. 5 denote the same or corresponding constituent elements in FIG. 7.

The user signal processing unit 507 comprises a calibration coefficient storage unit 701, antenna weight correction unit 702, user signal output unit 703, and total transmission power value input unit 704.

The calibration coefficient storage unit 701 stores the value of the calibration coefficient measured before the operation of the apparatus in advance in correspondence with the total transmission power value and the transmission frequency value in measuring the calibration coefficient.

During the operation of the apparatus, the total transmission power value input unit 704 receives the total transmission power measured value output from each of the total transmission power measuring unit 1 $512_1$ to total transmission power measuring units N $512_N$ and the transmission frequency (carrier frequency) set value of the user signal output from the user signal output unit 703. The total transmission power value input unit 704 reads out the calibration coefficient corresponding to the total transmission power measured value and the transmission frequency set value from the calibration coefficient storage unit 701 and outputs the calibration coefficient to the antenna weight correction unit 702.

The antenna weight correction unit 702 corrects the antenna weight by adding the calibration coefficient read out by the total transmission power value input unit 704 to the antenna weight to weight the user signal and outputs the corrected antenna weight to the user signal output unit 703.

The user signal output unit 703 weights each user signal by using the antenna weight corrected by the antenna weight correction unit 702 and outputs the user signals to the antenna 1 signal processing unit $505_1$ to antenna N signal processing unit $505_N$. The user signal output unit 703 also outputs the transmission frequency set value of each user signal to the total transmission power value input unit 704.

Major factors of the phase/amplitude variation in the transmission path are the total transmission power and transmission frequency. Hence, when calibration is executed in consideration of the saturation characteristic and frequency characteristic in the constituent element in the transmission path by using the calibration coefficient corresponding to the total transmission power measured value and transmission frequency set value, offline calibration (before operation) can accurately be executed.

The calibration coefficient measured before the operation of the apparatus is stored in the calibration coefficient storage unit 701. The calibration coefficient is read out and used for calibration during the operation. With this arrangement, the calibration coefficient measuring apparatus (adder 608, radio receiving unit 609, calibration signal demodulation unit 1 $610_1$ to calibration signal demodulation unit N $610_N$, and demodulation result processing unit 611) shown in FIG. 6 is unnecessary. For this reason, the apparatus scale necessary for calibration can be minimized.

Array antenna transmitting/receiving apparatuses which execute adaptive antenna control have been described above. However, the present invention can also be applied to a transmitting apparatus which has two antenna elements and executes transmission diversity.

The present invention can be used to, e.g., calibrate the phase (delay)/amplitude (gain) characteristic of a W-CDMA radio base station transmitting apparatus which executes adaptive antenna control or transmission diversity.

As described above, in the transmitting apparatus of the present invention, the value of total transmission power transmitted from the antenna element is measured, and the antenna weight is corrected on the basis of the measured value.

The remaining system capacity of carrier power can be known from the measured value of total transmission power transmitted from the antenna element. Hence, when the calibration signal output timing is determined in consideration of the remaining system capacity, calibration can appropriately be executed in accordance with the remaining system capacity. Even in online calibration (during operation), the calibration can be prevented from suppressing the remaining system capacity of carrier power.

The calibration signal output timing is determined, and the calibration frequency is adjusted on the basis of the measured value of total transmission power transmitted from the antenna element. Hence, the load of signal processing can be reduced in online calibration (during operation).

The set power of the calibration signal is determined on the basis of the measured value of total transmission power transmitted from the antenna element, thereby optimizing the calibration signal set power for the user signal. With this setting, in online (during operation) calibration, the calibration signal can be prevented from looking like interference for the user signal more than necessary, and the calibration accuracy can be prevented from being low.

The calibration coefficient acquired before the operation by using the total transmission power value (and transmission frequency value) as a parameter is stored in the storage means in advance. During the operation, the calibration coefficient corresponding to the total transmission power measured value (and transmission frequency set value is read out from the storage means and used to correct the antenna weight. A major factor of the phase/amplitude variation in the transmission path is the total transmission power (and transmission frequency). Hence, when calibration is executed in consideration of the saturation characteristic (and frequency characteristic) in the constituent element in the transmission path by using the calibration coefficient corresponding to the total transmission power measured value (and transmission frequency set value), offline calibration (before operation) can accurately be executed.

The calibration coefficient acquired before the operation by using the total transmission power value (and transmission frequency value) as a parameter is used to correct the antenna weight. With this arrangement, there can be omitted constituent elements (e.g., distributors, radio receiving unit, calibration signal demodulation units, and demodulation result processing unit) until the calibration signal is distributed, and the calibration coefficient is calculated. For this reason, the apparatus scale necessary for calibration can be minimized.

What is claimed is:
1. A transmitting apparatus comprising:
 a plurality of antenna elements;
 user signal output means for weighting a user signal by an antenna weight and outputting the user signal to each of said antenna elements;
 calibration signal generation means for outputting a calibration signal to be used to detect a characteristic of a transmission path;
 antenna signal processing means, provided in the transmission path, for executing spread modulation and multiplexing for the user signal input from said user signal output means and the calibration signal input from said calibration signal generation means and outputting an obtained multiplexed signal;

total transmission power measuring means for measuring a value of total transmission power of the multiplexed signal to be transmitted from each of said antenna elements on the basis of the multiplexed signal input from said antenna signal processing means; and antenna weight correction means that executes a correction operation on the basis of the value of the total transmission power.

2. An apparatus according to claim 1, further comprising antenna weight correction means for correcting the antenna weight in accordance with the characteristic of the transmission path from said user signal output means to each of said antenna elements.

3. An apparatus according to claim 2, further comprising calibration signal generation control means for determining at least one of an output timing of the calibration signal and a set power of the calibration signal on the basis of the value of the total transmission power input from said total transmission power measuring means and outputting the result to said calibration signal generation means.

4. An apparatus according to claim 3, further comprising calibration signal demodulation means for demodulating the calibration signal corresponding to each transmission path from the multiplexed signal extracted from the transmission path, and demodulation result processing means for calculating a calibration coefficient based on the characteristic of the transmission path by comparing the calibration signals corresponding to transmission paths, which are input from said calibration signal demodulation means, wherein said antenna weight correction means corrects the antenna weight on the basis of the calibration coefficient.

5. An apparatus according to claim 4, further comprising storage means for storing the calibration coefficient input from said demodulation result processing means, wherein said antenna weight correction means corrects the antenna weight on the basis of the calibration coefficient stored in said storage means.

6. An apparatus according to claim 3, wherein said calibration signal generation control means comprises addition means for adding the values of the total transmission powers input from said total transmission power measuring means, and calibration execution determination means for determining on the basis of a value of a maximum transmission power of the apparatus and a sum of the total transmission powers obtained by said addition means whether to cause said calibration signal generation means to output the calibration signal.

7. An apparatus according to claim 3, wherein said calibration signal generation control means comprises calibration execution determination means for determining on the basis of a value of a maximum transmission power transmittable from each of said antenna elements and the value of the total transmission power whether to cause said calibration signal generation means to output the calibration signal.

8. An apparatus according to claim 3, wherein said calibration signal generation control means determines a set power of the calibration signal so as to obtain a predetermined power ratio of the user signal to the calibration signal.

9. An apparatus according to claim 2, further comprising storage means for storing in advance the calibration coefficient based on the characteristic of the transmission path, which varies in accordance with the value of the total transmission power, in correspondence with the value of the total transmission power, and total transmission power value input means for reading out, from said storage means, the calibration coefficient corresponding to the value of the total transmission power input from said total transmission power measuring means and outputting the calibration coefficient to said antenna weight correction means, wherein said antenna weight correction means corrects the antenna weight on the basis of the calibration coefficient input from said total transmission power value input means.

10. An apparatus according to claim 9, wherein said storage means stores in advance the calibration coefficient based on the characteristic of the transmission path, which varies in accordance with the value of the total transmission power and a value of a transmission frequency, in correspondence with the value of the total transmission power and the value of the transmission frequency, and said total transmission power value input means reads out, from said storage means, the calibration coefficient corresponding to the value of the total transmission power and a set value of the transmission frequency, which are input from said total transmission power measuring means, and outputs the calibration coefficient to said antenna weight correction means.

11. An apparatus according to claim 1, wherein the number of antenna elements is not less than three.

* * * * *